(12) United States Patent
Hara et al.

(10) Patent No.: US 7,908,564 B2
(45) Date of Patent: Mar. 15, 2011

(54) COPYING AND PASTING A PLURALITY OF DATA ITEMS AS A GROUP

(75) Inventors: Masao Hara, Kanagawa (JP);
Motoharu Inoue, Yokohama (JP);
Koichi Nakamura, Machida (JP)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 11/536,934

(22) Filed: Sep. 29, 2006

(65) Prior Publication Data

US 2007/0074133 A1 Mar. 29, 2007

(30) Foreign Application Priority Data

Sep. 29, 2005 (JP) .................................. 2005-284264

(51) Int. Cl.
G06F 3/048 (2006.01)
G06F 17/00 (2006.01)

(52) U.S. Cl. ......... 715/770; 715/224; 715/225; 715/226; 715/853; 715/860

(58) Field of Classification Search .................. 715/224, 715/225, 221, 226, 770, 724, 822, 823, 860, 715/853, 855
See application file for complete search history.

(56) References Cited

U.S. PATENT DOCUMENTS

| | | | |
|---|---|---|---|
| 6,309,305 B1 * | 10/2001 | Kraft .............................. | 455/566 |
| 6,499,041 B1 * | 12/2002 | Breslau et al. ................. | 715/210 |
| 6,651,217 B1 * | 11/2003 | Kennedy et al. ............... | 715/224 |
| 6,662,340 B2 * | 12/2003 | Rawat et al. ................... | 715/236 |
| 7,472,339 B2 * | 12/2008 | Bauchot ......................... | 715/214 |
| 7,516,398 B2 * | 4/2009 | Yang .............................. | 715/230 |
| 7,574,675 B1 * | 8/2009 | Linker et al. .................. | 715/841 |
| 2004/0181749 A1 * | 9/2004 | Chellapilla et al. ............ | 715/505 |
| 2004/0205526 A1 * | 10/2004 | Borodovski et al. .......... | 715/505 |
| 2005/0172241 A1 * | 8/2005 | Daniels et al. ................. | 715/770 |

(Continued)

FOREIGN PATENT DOCUMENTS

JP 05298003 11/1993

(Continued)

OTHER PUBLICATIONS

Citrine Clipboard Project, http://www.cs.cmu.edu/~citrine/, Jul. 30, 2004, retrieved using http://web.archive.org.*

(Continued)

*Primary Examiner* — Tadeese Hailu
*Assistant Examiner* — Nicholas S Ulrich
(74) *Attorney, Agent, or Firm* — Stephen J. Walder, Jr.; Jill A. Poimboeuf

(57) ABSTRACT

A context menu including a group copy function is displayed and, when the function is selected, all parent nodes of a node corresponding to the input field the pointing device is positioned over are displayed as alternatives to be copied. In response to selection of a parent node for copying by the pointing device, data in all nodes lower than the parent node are copied into a memory. In response to clicking by the pointing device in the input field selected as a pasting destination, a data type of the input field selected as the copying destination and the data type of the data copied into the memory are compared, and if the same, all of the data copied into the memory are pasted in the fields lower than the input field previously selected as the pasting destination.

20 Claims, 10 Drawing Sheets

U.S. PATENT DOCUMENTS

| | | | |
|---|---|---|---|
| 2005/0198563 A1* | 9/2005 | Kristjansson | 715/507 |
| 2007/0234227 A1* | 10/2007 | Prinsen et al. | 715/769 |
| 2008/0222548 A1* | 9/2008 | Cohen et al. | 715/770 |

FOREIGN PATENT DOCUMENTS

| | | |
|---|---|---|
| JP | 07146863 | 6/1995 |
| JP | 10143506 | 5/1998 |
| JP | 10171900 | 6/1998 |
| JP | 200011604 | 1/2000 |
| JP | 2001101180 | 4/2001 |
| JP | 2001199133 | 7/2001 |
| JP | 2001357343 | 12/2001 |
| JP | 2005031979 | 2/2005 |
| JP | 2007233630 | 9/2007 |
| JP | 2007328457 | 12/2007 |

OTHER PUBLICATIONS

Stylos Jeffrey, Citrine: Providing Intelligent Copy-and-Paste, http://www.cs.cmu.edu/~citrine/, Jul. 30, 2004.*

* cited by examiner

FIG. 2

```
...
<TABLE>
  <TBODY>
    <span class="ADDRESS" name="ORERER ADDRESS">
    <TR>
        <TD bgcolor="#adefb6" width"100">ADDRESS</TD>
        <TD></TD>
    </TR>
    <TR>
        <TD bgcolor="#adefb6" aline="right">ZIP CODE</TD>
        <TD><INPUT style="background-color:#FFFFFF" type="text"name="ZIP CODE"
        size="10"></TD>
    </TR>
    <TR>
        <TD bgcolor="#adefb6" aline="right">PREFECTURE</TD>
        <TD><INPUT style="background-color:#FFFFFF" type="text"name="PREFECTURE"
        size="100"></TD>
    </TR>
    <TR>
        <TD bgcolor="#adefb6" aline="right"> CITY•TOWN•VILLAGE </TD>
        <TD><INPUT style="background-color:#FFFFFF" type="text"name="CITY•TOWN•VILLAGE"
        size="100"></TD>
    </TR>
    <TR>
        <TD bgcolor="#adefb6" aline="right">BLDG & ROOM No.</TD>
        <TD><INPUT style="background-color:#FFFFFF" type="text"name="BLDG & ROOM No."
        size="100"></TD>
    </TR>
    </span>
  </TBODY>
</TABLE>
...
```

| ADDRESS | |
|---|---|
| ZIP CODE | 212-0058 |
| PREFECTURE | KANAGAWA PRE. |
| CITY•TOWN•VILLAGE | 1234-56 SHIMOTURUMA, YAMATO CITY |
| BLDG & ROOM No. | YAMATO ESTABLISHMENT A5NW3 |
| EMAIL ADDRESS | abcdefg@ibm.com |

| ADDRESS | |
|---|---|
| ZIP CODE | 212-0058 |
| PREFECTURE | KANAGAWA PRE. |
| CITY•TOWN•VILLAGE | 1234-56 SHIMOTURUMA, YAMATO CITY |
| BLDG & ROOM No. | YAMATO ESTABLISHMENT A5NW3 |
| EMAIL ADDRESS | abcdefg@ibm.com |

FIG. 6

COPYING AND PASTING A PLURALITY OF DATA ITEMS AS A GROUP

FIELD OF THE INVENTION

The present invention relates to a method, an apparatus, and a computer program for copying and pasting together data from a plurality of input fields. Copy and paste means a function that causes certain data to be copied and stored in a memory and then taken out from the memory and displayed in a desired location.

BACKGROUND OF THE INVENTION

In some cases, input data consists of a plurality of separate data items. For example, "Address" data consists of a plurality of data items, such as, "Zip code", "Prefecture", "City, town, village", "Bldg & room no.", and the like. In the case wherein the same address data has to be inputted into a plurality of input fields, if the same input data can be copied and pasted all together to the other place, work efficiency for input operations can be improved. However, conventionally, it has been necessary to copy and paste each data item, such as "Zip code", "Prefecture", "City, town, village", "Bldg & room no.", and the like, one by one.

Japanese Unexamined Patent Publication No. 5-298003 discloses "Data processing device", which is a technique for having a plurality of paste buffers. The invention provides a plurality of paste buffers, in each of which data in the source screen data is stored. However, in that invention, one buffer out of the plurality of paste buffers is selected, and the selected buffer data is displayed in a certain place in a target edit screen. Therefore, from the point of view of efficiency for copying and pasting of data in a plurality of fields, it is not effective since the fields have to be selected one by one to paste the data. This is because the invention does not aim to realize copy and paste of a plurality of relating data all together, but to avoid repeatedly switching between displaying the source screen and the editing target screen, and irrespective of the relation between the individual items in the plurality of data, the desired data is once copied to the plurality of paste buffers and then the destination of each buffer data is assigned one by one.

Also, Japanese Unexamined Patent Publication No. 2005-31979 discloses "Information processing method, information processing program, information processing device, and remote controller", which is intended to provide an information processing method, an information processing device, and the like, which are able to perform copying and pasting relating to a plurality of objects with a simple operation. However, in this instance, it takes a lot of processing time since it is necessary to analyze an HTML document every time a copy action or a paste action is issued, for performing a meaning analysis process to analyze the meaning of respective subject, and perform a pasting destination selection process for selecting a paste destination that matches the result of the meaning analysis. Also, in some case, since accuracy of the analysis largely depends on the amount of information in the meaning database, an unintended field may be included in fields to be copied.

SUMMARY OF THE INVENTION

An object of the present invention is to provide a method, an apparatus, and a computer program by which upon copying and pasting data arranged in a plurality of input fields to other input fields, data arranged in a plurality of input fields can be easily and accurately copied and pasted all together.

Another object of the present invention is to provide a method, an apparatus, and a computer program by which a unit of data to be copied and to be pasted all together is set freely, by selecting a parent node for copying and pasting all together.

Still another object of the present invention is to provide a method, an apparatus, and a computer program by which when a pointer is positioned at the parent node to be copied, it is possible to confirm whether or not a copy area for copying all together is correct, by highlight-displaying all input fields to be copied all together along with the parent node, and also when the parent node to be copied is selected, input fields lower than the parent node, and input fields having the same data type as the fields lower than the parent node, can be highlight-displayed.

Still another object of the present invention is to provide a method, an apparatus, and a computer program by which a user can easily confirm whether or not a selected pasting destination is correct when the pointer is positioned on "group pasting", by highlight-displaying the input field of the pasting destination, and by which an erroneous pasting can be prevented in the input field where the pasting is not allowed, by prohibiting selecting the "group pasting" work item from a context menu.

A context menu including a group copying function as one of alternatives is displayed, in response to selecting (clicking) of a pointing device such as a mouse, keyboard, track ball, and the like, in an input field, and in a case where the pointer is positioned at the group copying function, all parent nodes of the node corresponding to the input field at which clicking of the pointing device is detected, are displayed. This is realized by defining the correspondence relationship between each input field and each node of hierarchical structural information in advance. Also, in response to selecting of the parent node to be copied by clicking of the pointing device, or the like, the data of all the nodes lower than the parent node is copied to a memory.

Incidentally, the phrase "a pointer is positioned" means that the pointer of the pointing device is positioned at a target location. That is, this is in such a situation that selecting (clicking) by the pointing device is not yet performed. In most cases, an item where the pointer is positioned is highlight-displayed in order to emphasize that it is a selectable alternative.

Then, in response to clicking of the pointing device at the input field selected as a pasting destination, which is different from the input field previously selected, the data type of the data of the input field selected as the pasting destination is compared with the data type of the data copied in the memory, and if both data types are the same, a context menu including a group pasting function as one of selections or alternatives is displayed.

Then, when the group pasting function is selected, copying and pasting of a plurality of data all together is realized by pasting all the data copied in the memory in the input fields lower in hierarchy than the input field selected as the pasting destination by the pointing device.

According to the present invention, significant improvement of work efficiency in data input is realized by enabling copying and pasting of data arranged in a plurality of fields all together in a single operation.

Also, when performing all-together copying or collective copying, it is possible to freely set a unit of data for copying and pasting all together since nodes which are lower than any specific parent node can be selected so that the data of nodes lower than the parent node can be copied. When performing pasting, it is determined whether or not the data type of the pasting destination is the same as the data type of the copied data, and only if both data types are the same, the paste function is performed, and thereby erroneous copying and pasting is prevented.

Furthermore, it is possible to help perform accurate and fast copying and pasting of desired data by highlight-displaying the data to be copied or highlight-displaying the input fields available for pasting during the copy and paste operation.

BRIEF DESCRIPTION OF THE DRAWING

FIG. 2 shows an example of an input screen having a plurality of input fields.

FIG. 6 is a view showing a case in which data does not include the structured information.

DETAILED DESCRIPTION OF THE INVENTION

Figure 1:
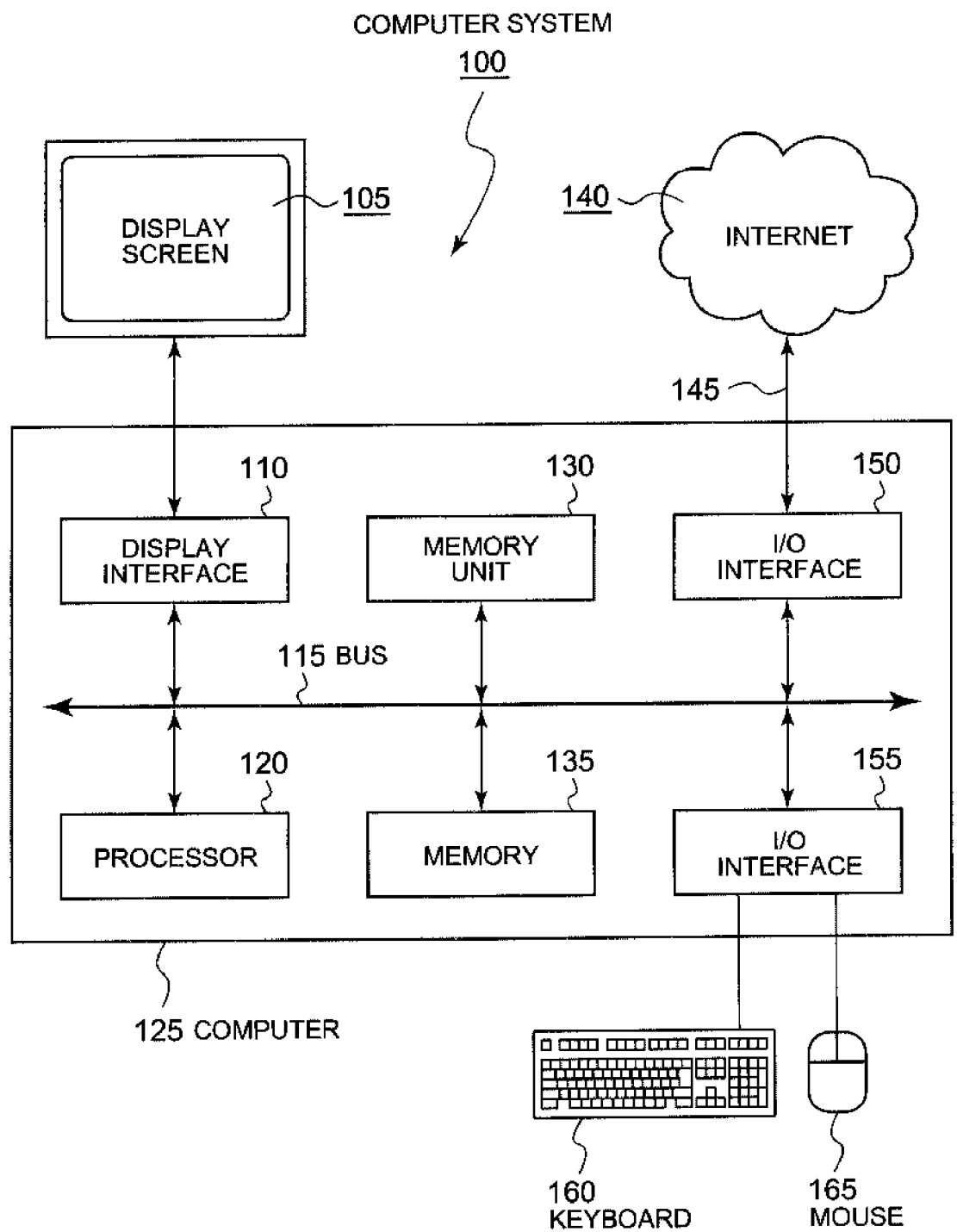
FIG. 1 shows an example of a system configuration.

The configuration of a computer system used in the present invention is firstly explained with reference to FIG. 1.

A computer system 100 includes a display screen 105 for displaying input fields, a memory unit 130 for storing data of input fields and structure information, a memory 135 for storing copied contents in the case in which group copying is selected, a processor 120 for determining whether or not the data type of the input field selected as a pasting destination is identical to the data type of the data copied in the memory, and so on, internet 140 for obtaining data or programs from the outside, a keyboard 160 for performing input operations, and a pointing device 165, such as a mouse.

Figure 2:
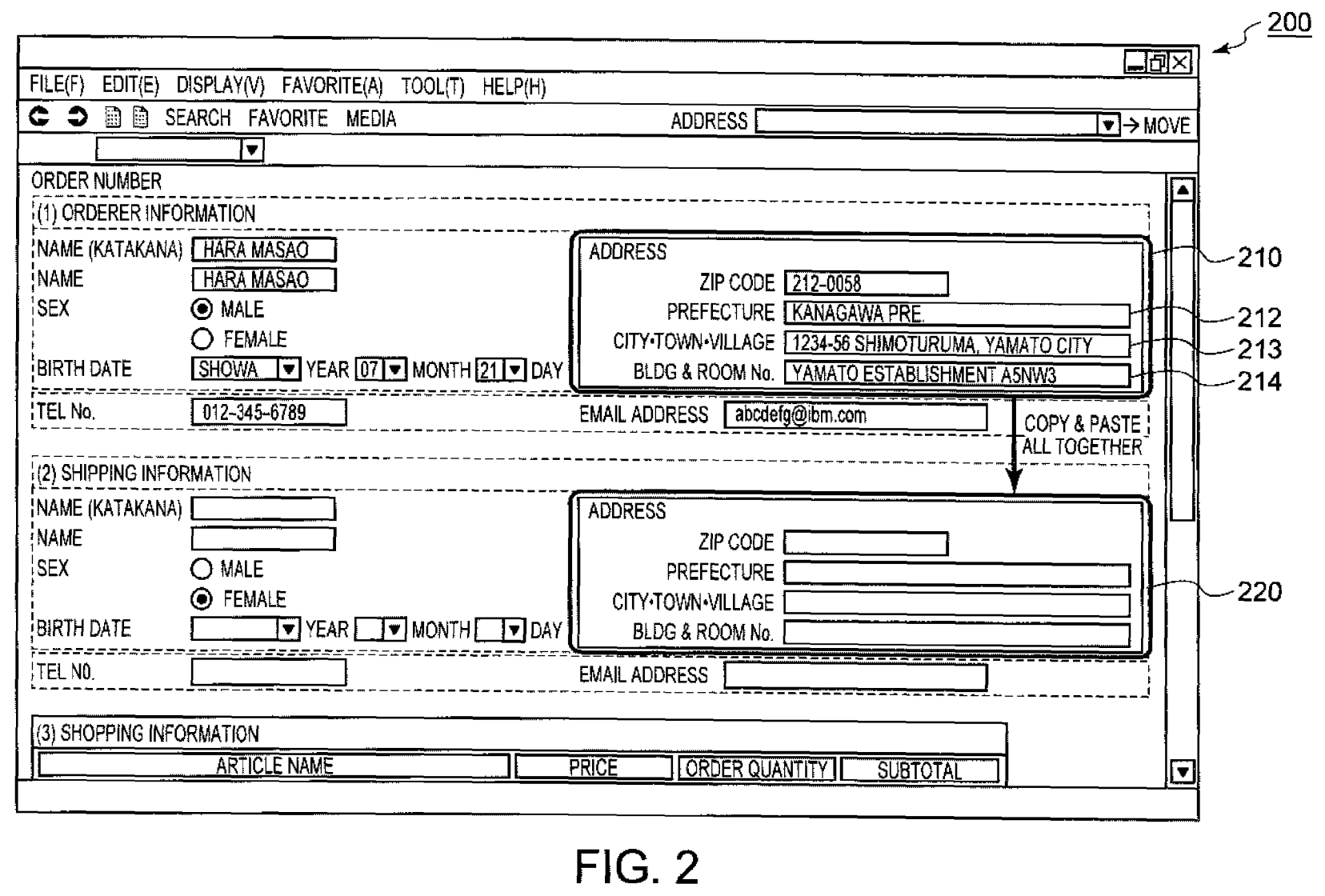

FIG. 2 shows a graphical user interface (GUI) (200) of the input screen. The GUI is a screen having a plurality of input fields provided for users to input data. ADDRESS data 210 of ORDERER'S INFORMATION in FIG. 2, includes data of a plurality of input fields such as "ZIP CODE" 211, "PREFECTURE" 212, "CITY, TOWN, VILLAGE" 213, and "BLDG & ROOM NO." 214. In the case where ORDERER'S ADDRESS 210 and SHIPPING ADDRESS 220 are the same, if the data of ORDERER'S ADDRESS 210 can be copied and pasted to the input fields of SHIPPING ADDRESS 220 all together, work efficiency of inputting data significantly improves. The process for selecting input fields to be copied all together, and pasting data all together will be explained below.

Figure 3:
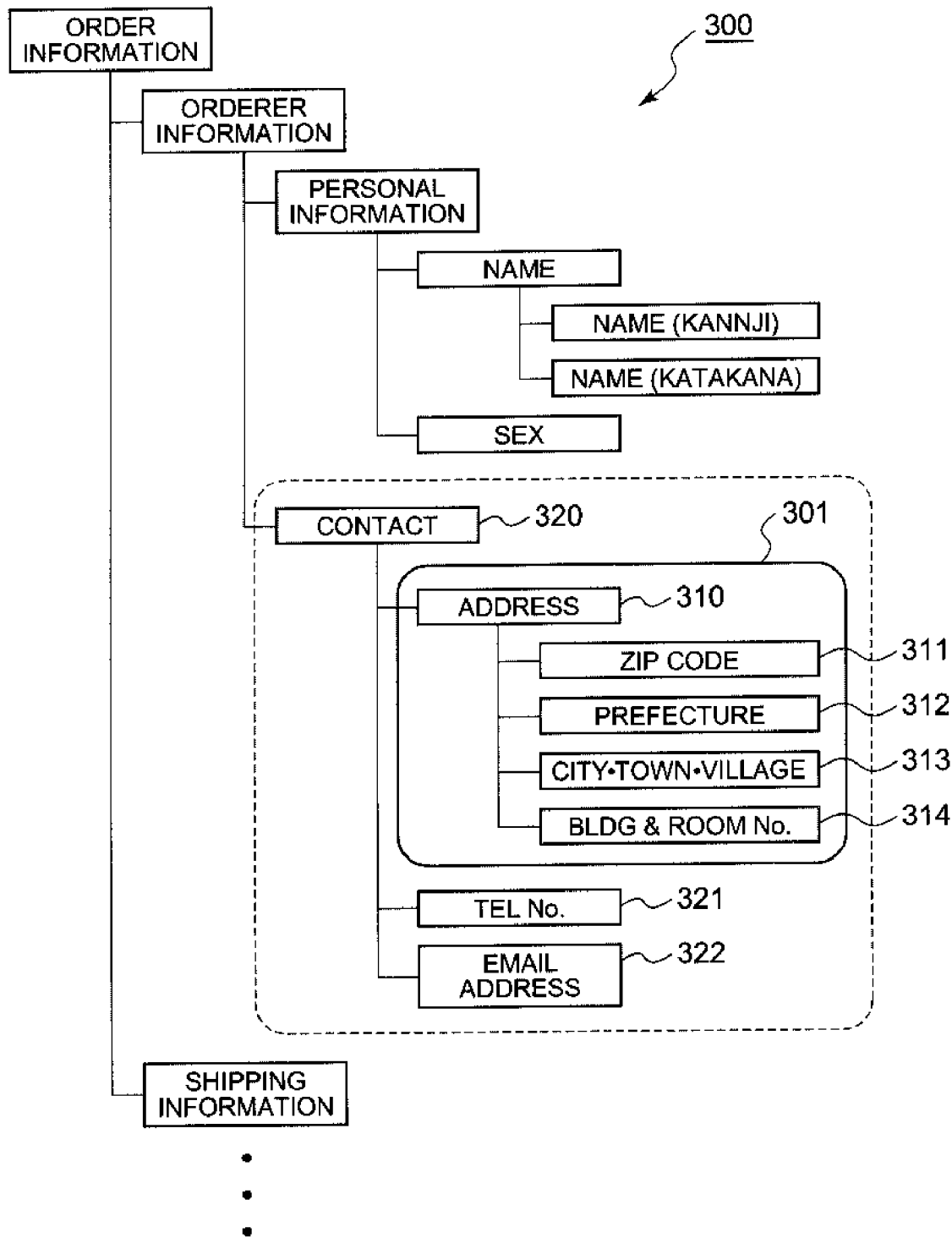
FIG. 3 is a view showing structured information.

First, data items to be processed in the input screen, that is, the field names of input fields, are analyzed to obtain structured information 300 of a hierarchical structure as shown in FIG. 3, and the result stored in the memory unit. Incidentally, each piece of the structured information, that is, "ZIP CODE" 311, "PREFECTURE" 312, or the like, is called a node, and information which includes the hierarchical structure is called structured information. Since each node of the GUI and each input field are associated with or related to each other in the structured information, when the value of a node is changed, the corresponding value of the input field will be also changed. This will be explained later. On the contrary, if the value of the input field is changed, the corresponding value of the node will be changed accordingly.

In detail, as shown in FIG. 3, the parent node 310 indicating "ADDRESS" is followed by lower nodes such as "ZIP CODE" node 311, "PREFECTURE" node 312, "CITY, TOWN, VILLAGE" node 313, and "BLDG. & ROOM NO." node 314.

In the present invention, by selecting "ADDRESS" as the parent node to be copied, it is possible to copy and paste the data of the lower nodes of ADDRESS such as data of "ZIP CODE", "PREFECTURE", "CITY, TOWN VILLAGE", and "BLDG, & ROOM NO." all together, and also to select the "CONTACT" 320, which is a higher node of "ADDRESS", as an object of copy and paste. If "CONTACT" 320 is selected as a copying object, not only ADDRESS data, that is, "ZIP CODE", "PREFECTURE", "CITY, TOWN, VILLAGE", and "BLDG. & ROOM NO.", but also the data of "TEL NO." 321 and "MAIL ADDRESS" 322 are copied and pasted all together. That is, it is possible to freely set the selection of the range of the nodes from start to end to be copied and pasted all together, since the information is structured.

In the present invention, copying a plurality of data in a plurality of input fields all together is called "group copying", and pasting the plurality of data all together is called "group pasting".

Figure 4:
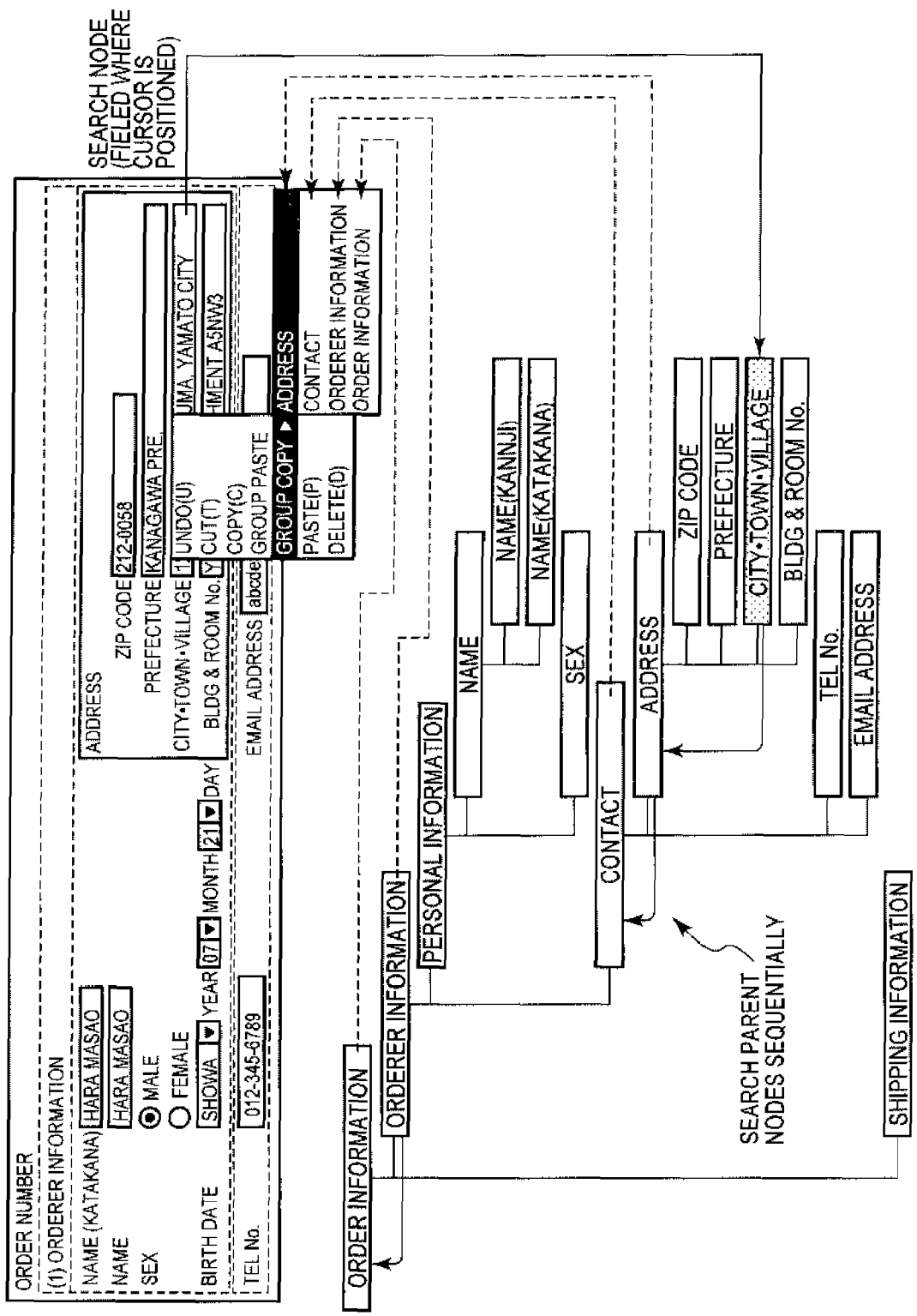
FIG. 4 is a view showing a search for a parent node.

Now, the process for selecting a parent node for copying will be explained with reference to FIG. 4. In the present invention, in order to provide a user with the specific set of input fields that are to be copied and to receive a selection by the user, a parent node binding a plurality of input fields to be copied is displayed on a context menu, which is displayed when the pointing device is right-clicked. FIG. 4 shows an example of the case in which the pointer is positioned on "CITY, TOWN, VILLAGE" field. First, the selected node, which is a node corresponding to the input field where the pointer is positioned on the GUI, that is, the "CITY, TOWN, VILLAGE" in the example of FIG. 4, is acquired, and next, parent nodes, which are positioned hierarchically higher than the selected node, are obtained sequentially. That is, the parent nodes of the "CITY, TOWN, VILLAGE" are "ADDRESS", "CONTACT", "ORDERER INFORMATION" and "ORDER INFORMATION".

Then, when the pointer is positioned on the group copying in the context menu, a list of the obtained parent nodes as a copying object for group copying, that is, "ADDRESS", "CONTACT", "ORDERER INFORMATION" and "ORDER INFORMATION", are displayed. Then, the user can perform the group copying of a plurality of data which the user desires, by selecting the desired parent node.

In short, since the input fields are structured in a hierarchical structure as shown in FIG. 4, it is possible to freely select the range of data to be copied all together by selecting a desired parent node.

In order to perform the "group copying" explained above, it is necessary that the input fields of the GUI are associated with or related to the structured information including the hierarchical structure. Therefore, in the present invention, the correspondence of field to node in the structured information is defined in advance and stored in the memory unit.

Next, the way in which the input fields and the nodes of the structured information are associated or related in advance will be explained.

There are following two kinds of input field data:

(1) the case in which an input field includes structured information as the data itself, and
(2) the case in which an input field does not include structured information as the data itself.

The above two cases will be explained as Embodiment 1 and Embodiment 2. In the embodiments, a method for associating input fields in the GUI with the structured information will be explained.

Embodiment 1

(1) The case in which an input field includes structured information as the data itself.

As a case in which the input field itself includes structured information, the case in which the handling data is an XML document will be explained by way of an example with reference to FIG. 5.

Figure 5:
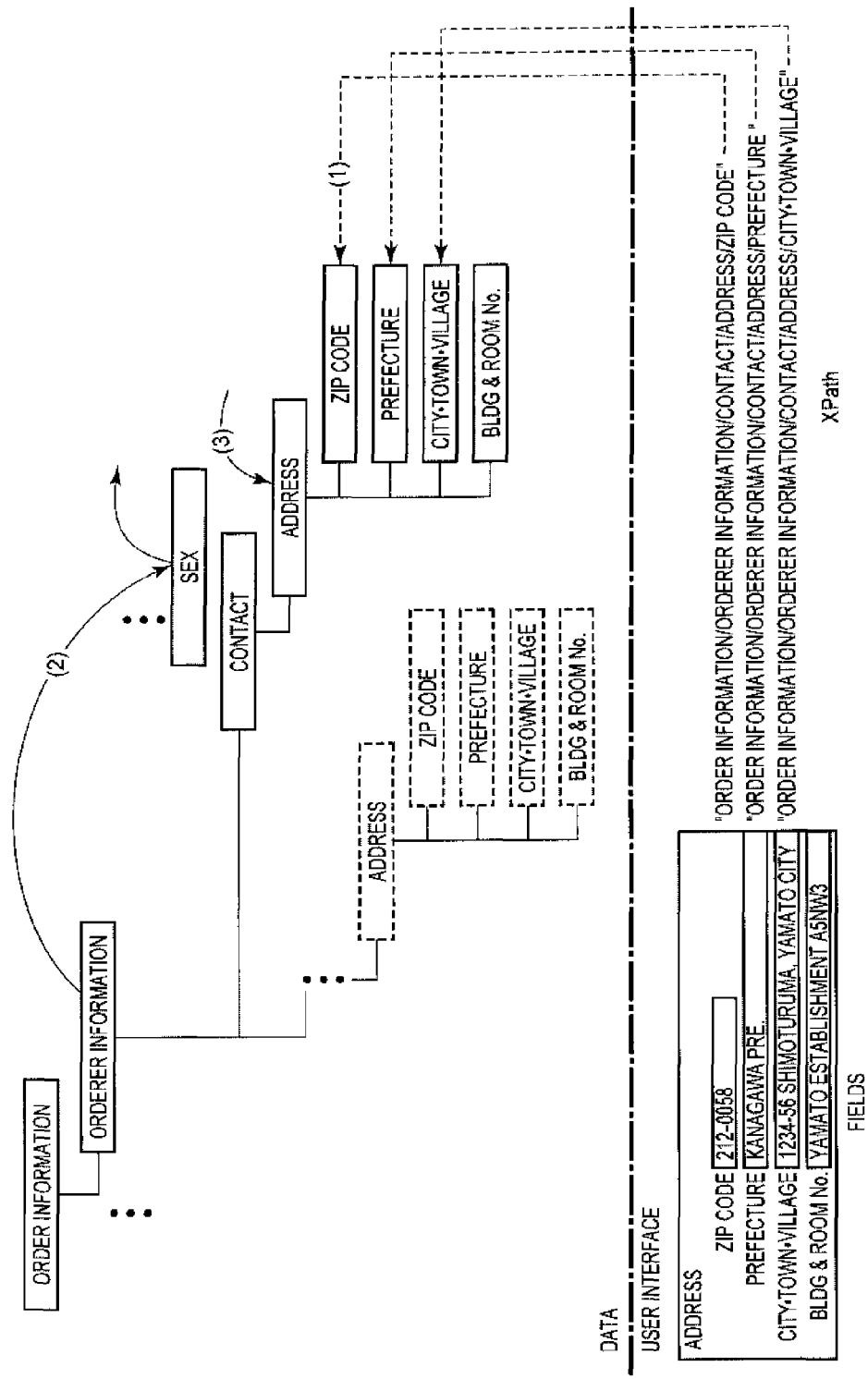
FIG. 5 is a view showing a case in which data includes structured information.

In this case, as shown in FIG. 5, the way in which correspondence between an input field and node in the structured information is solved by embedding a path (XPath) from the root of the corresponding node in the input field. That is, in FIG. 5, XPath of "ORDER INFIRMATION/ORDERER'S INFORMATION/CONTACT/ADDRESS/ZIP CODE" is defined in advance in the input field "ZIP CODE", XPath of "ORDER INFORMATION/ORDERER'S INFORMATION/CONTACT/ADDRESS/PREFECTURE" is defined in advance in the input field "PREFECTURE", and XPath of "ORDER INFORMATION/ORDERER'S INFORMATION/CONTACT/ADDRESS/CITY, TOWN, VILLAGE" is defined in advance in the input field "CITY, TOWN, VILLAGE", and they are stored in the memory unit.

By arranging in this manner, each input field and each node of structured information are associated with or related to each other, and therefore, for example, a value inputted in the "ZIP CODE" input field is assigned to the node of the structured information corresponding to the input field, and thus, the value inputted in each input field is assigned to the corresponding node of the structured information.

That is, as shown in (1) of FIG. 5, each input field and each node of the structure information are mapped by using XPath. Therefore, if the pointer is moved to a certain input field, the node of the structure information which matches its path is retrieved, and thereby the corresponding node can be selected.

As shown in (2) of FIG. 5, scanning of data in the structured information is performed by using Object which provides access to the structured information (example: IContentsProvider).

In addition, the group copying and the group pasting are performed by defining CopyAction and PasteAction, as Object processing copying and pasting in XML data. For example, if the group copying is selected in the field which is lower than "ADDRESS", the node "ADDRESS", as the parent node, can be selected. This is because CopyAction and PasteAction have Object which detects the change of location of the pointer in the GUI (ex, ISelectionChangedListener), the currently selected node and input field are obtained, and an action for selecting the parent node for the selected node can be performed, as shown in (3) of FIG. 5.

Furthermore, when the "group copying" action is selected, if a field having the same data type as the data type which has been group-copied is selected as a pasting destination, the group pasting is set to be available. That is, the "group pasting" can be selected in the context menu. However, otherwise, the "group pasting" is not selectable (disabled). Then, when a user selects the "group pasting" from the context menu, PasteAction is performed, and the data copied in the memory is pasted to the pasting destination.

Embodiment 2

(2) The case in which input field does not include structured information as the data itself.

An example of using an HTML document will be explained in this embodiment. However, documents other than an HTML document may be also acceptable as long as it is possible to embed structured information into a GUI and possible to access the structured information.

Since the input fields do not include structured information in the HTML, which is unlike XML, XPath can not be defined. Instead, as shown in FIG. 6, correspondence relationship between each input field and each node in the hierarchical structure is defined by the hierarchical structure of "span".

First, a data type is defined in each data field in order to add structured information to each input field. The definition of the data type is performed by surrounding a child node with a <span> . . . </span> tag as shown in FIG. 6, and describing a type name in a "class" attribute or in a "name" attribute of INPUT node written in the span tag. Then, the defined information is stored in the memory unit.

HTML is fundamentally a language for specifying a displaying method only, however, structure information can be embedded in an HTML document by using <span> tag, which does not affect the display. Thereby, it is possible to define structure information about each field without being affected by constraints of display positions.

For accessing the structure information during copying or pasting, the document object model (DOM), which mediates access to the structure information of an HTML document, is used. In response to selecting "group copying" or "group pasting" on the context menu, the top node of the structure is acquired via the DOM, and the fields lower than the top node are parsed. When "group copying" is performed, the field values of all fields to be copied are stored in the memory via the DOM.

Whether "group pasting" is available or not is determined by verifying whether or not the data type of the top node in the copied hierarchical information and the data type of the field selected as a pasting destination match. A processor determines whether or not both data types are the same, that is, if the top node in the hierarchical structure of the copied data and the input field selected as the pasting destination have the same type name specified in a "class" attribute or a "name" attribute of the INPUT node written in the span, as shown in FIG. 6, the data types are determined to be the same.

In other words, if "group pasting" is performed, the type name of <span> is used to identify the top node of the pasting destination, and values are stored in the fields lower than the top node. Also, highlight of the fields is performed by rewriting "background-color" of a "style" attribute in the fields. In one embodiment, a copy and paste process is performed by describing the process in JavaScript and analyzing the JavaScript by a browser.

Figure 7:
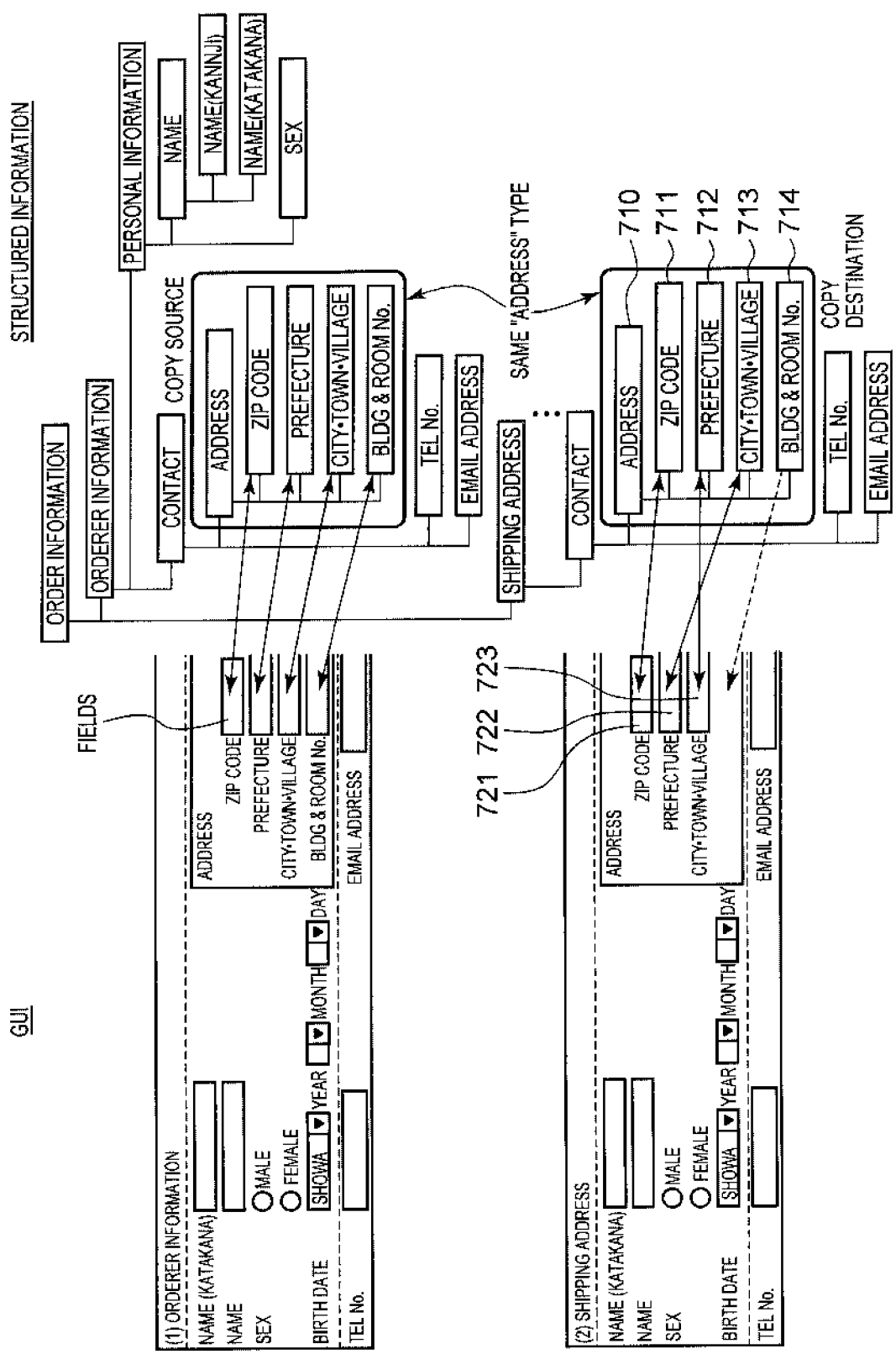
FIG. 7 is a view showing association of a node and an input field.

As described above, whether the input field itself includes the structured field or not, the input fields in the GUI and the nodes of the structured information that includes a hierarchical structure are associated with or related to each other. Therefore, as shown in FIG. 7, even if the order of the input fields is "ZIP CODE", "PREFECTURE", "CITY, TOWN, VILLAGE" and "BLDG. NO.", and the order of the input field as a pasting destination is "Zip CODE", "CITY, TOWN, VILLAGE" and "PREFECTURE", that is, the two orders are different from each other and there is no input field of "BLDG. ROOM NO." in the pasting destination, since each input field is associated with a node of the structured information, as described above, the copied data is pasted to the correct fields.

Also, even if input fields such as "ZIP CODE", "CITY, TOWN, VILLAGE", "PREECTURE", and the like are located sparsely, not located in series, the copied data can be pasted in the correct input fields.

Figure 8:
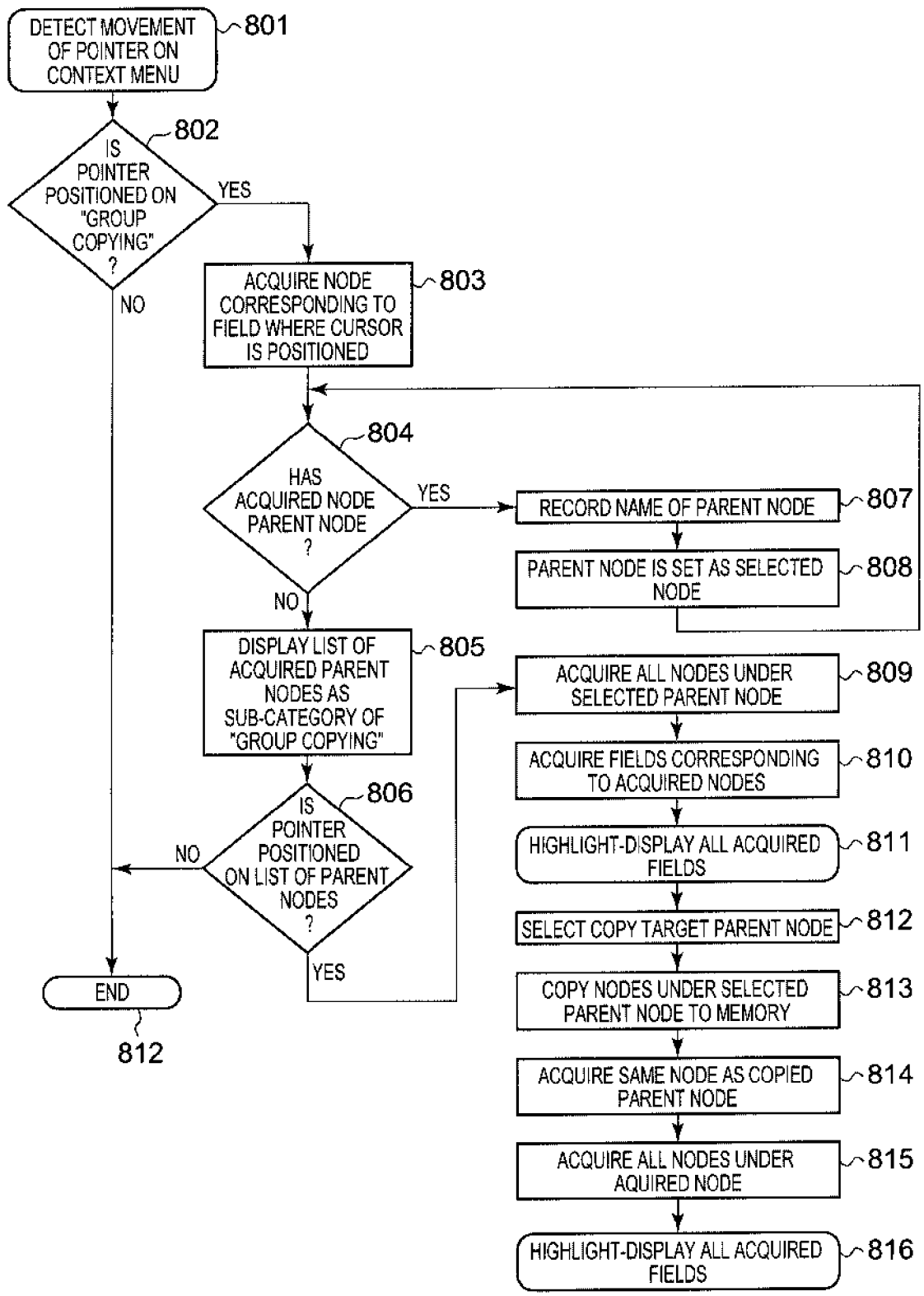
FIG. 8 is a flowchart of a process of group copying.

Next, a process flow when the group copying is selected in the context menu in both the cases of Embodiment 1 (Input field data includes structured information) and Embodiment 2 (Input field data does not include structured information) will be explained with reference to the flowchart of FIG. 8.

First, movement of the pointer of a pointing device is detected in the context menu (801), and a processor determines if the pointer is positioned on the "group copying" selection in the context menu (802). If the pointer is positioned on "group copying", the node of structured information corresponding to the input field where the context menu was selected (the context menu pointer) is obtained (803). Then, the processor determines if there is a parent node for the node where the context menu pointer is positioned (804), and if there is a parent node, the name of the parent node is recorded in a memory (807). Then, the parent node is set as a selected node (808), and higher parent nodes are searched for.

Then, when all the parent nodes have been retrieved, a list of the acquired parent nodes is displayed in the context menu as a sub-category (805), thus a parent node which is desired for group-copying can be selected from the parent nodes in the list.

Furthermore, when the context menu pointer is positioned on a desired parent node for group copying (806), all nodes lower than the parent node where the pointer is positioned are acquired (809), then the input fields corresponding to the acquired nodes (810), and the all acquired fields can be highlight-displayed by changing the color of the background, for example, to yellow (811). Therefore, since a user can visually recognize which fields are selected as a copying object, incorrect operations can be decreased and work efficiency will significantly improve.

Incidentally, in the highlight-copying, it is possible to change the color of the background to other colors other than yellow, and also possible to blink the highlighting. By highlighting the fields, users can visually recognize a copying object, and operations are facilitated.

Next, when the user selects a desired parent node from the list of the parent nodes in the context menu with the pointing device (812), a "group copying" action, in which the data lower than the parent node is copied to the memory is performed (813), while maintaining a hierarchical structure.

Immediately after the "copy action" is performed, the nodes of the same type as the copied parent node are searched for and acquired (814), and all the nodes lower that the parent node are acquired (815). Then all the acquired fields can be highlight-displayed (816). Since the highlighted fields are the fields where "group pasting" can be performed, users can visually recognize where the data copied in the "copy action" can be pasted.

Figure 9:
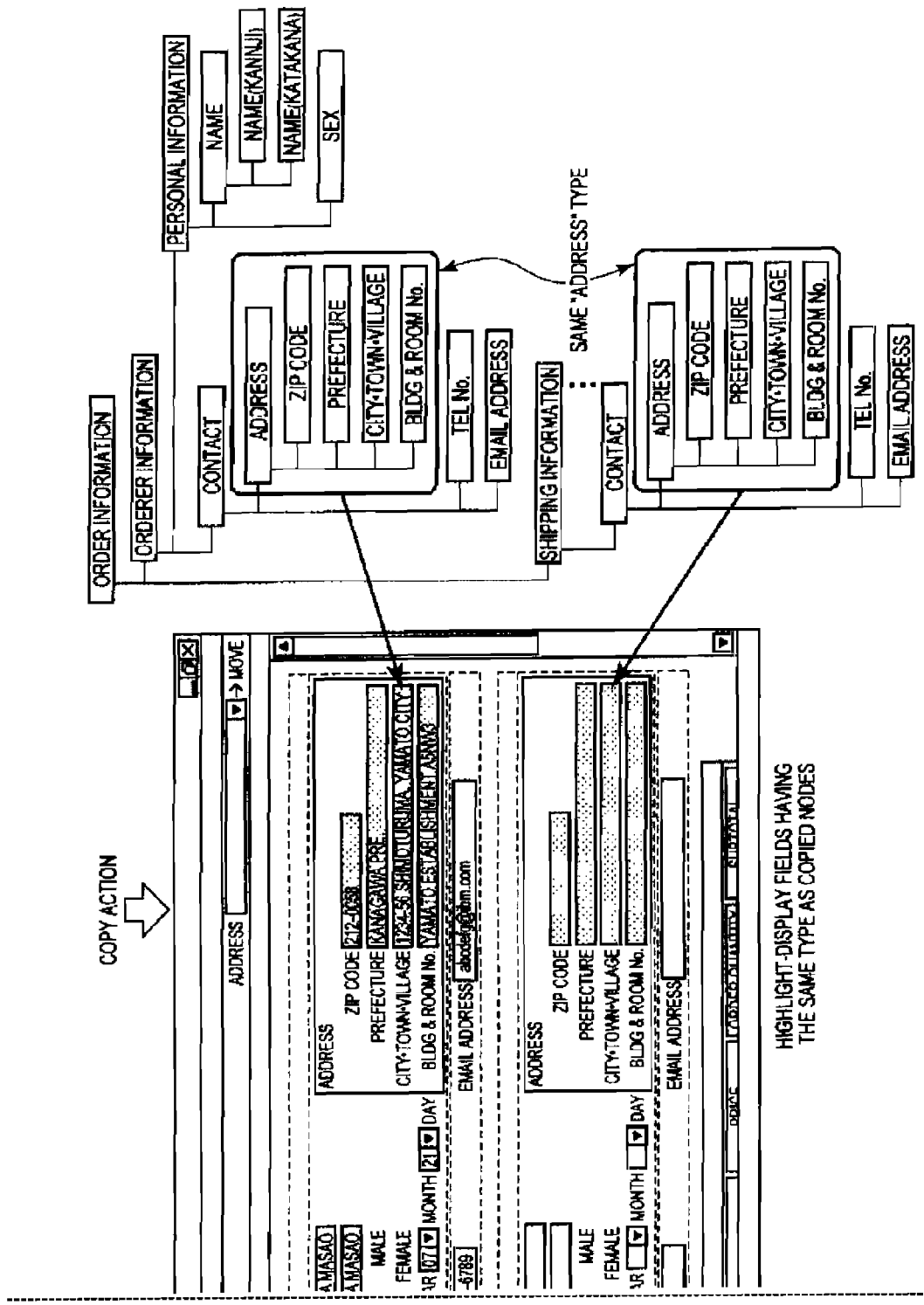
FIG. 9 is a view showing highlight-displaying of fields available for group pasting.

As described above, by highlight-displaying the nodes which have the same data type as the copied node, the fields available for paste are shown to users. FIG. 9 shows an example in which, when the orderer's address is copied, the shipping address which has the same data type as the orderer's address is highlight-displayed. As such, the user can confirm the field available for the paste before performing the "group pasting" action, and work efficiency for users for selecting the pasting destination significantly improves.

Figure 10:
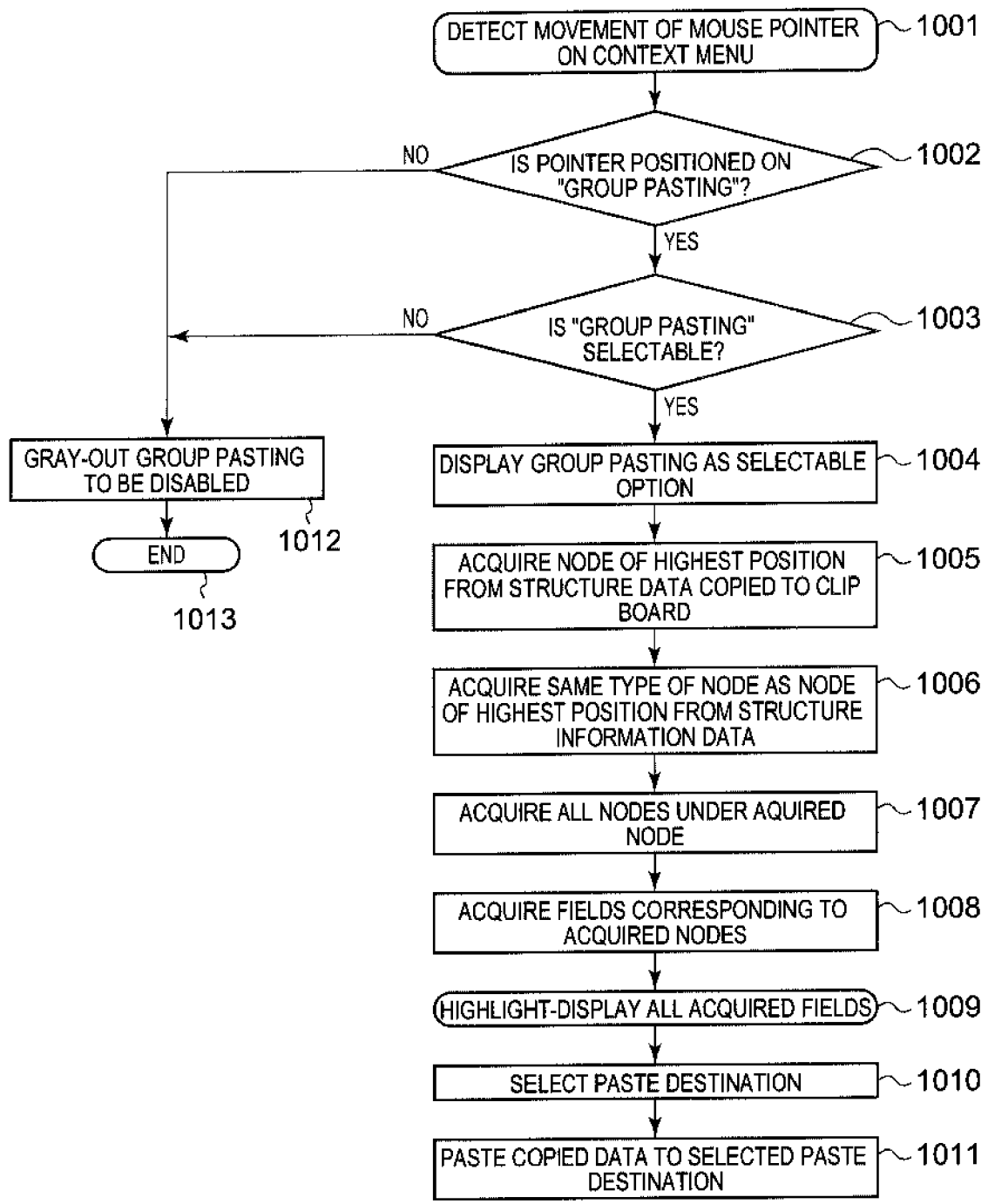
FIG. 10 is a flowchart of a process of group pasting.

Next, a process flow for displaying the "group pasting" in the context menu when the pointing device is right-clicked in a desired input field is shown in FIG. 10.

First, movement of the pointer of the pointing device is detected in the context menu (1001), and the processor determines if the pointer is positioned on group pasting (1002). If the pointer is positioned on the group pasting, the processor then determines if the group pasting is possible (1003), that is, since the copy source and a pasting destination must have the same data type, the processor determines if the data type of the data copied in the memory and the data type of the data of the pasting destination are the same.

Then, if the data type of the data copied in the memory and the data type of the data of the pasting destination are the same, "group pasting" is displayed as an available (enabled) option in the context menu (1004).

Furthermore, the parent node of the highest position is acquired from the data copied in the memory (1005), the nodes with the same data type as the parent node in the highest position are searched for in the structured information and acquired (1006), and then, all nodes existing lower than the acquired parent nodes are acquired (1007). Then, the input fields corresponding to the acquired nodes of structured information are searched for and acquired (1008), and all the acquired fields, that is, the fields available for paste, are highlight-displayed (1009). Thereby, the user can recognize the fields available for paste before performing the "group pasting" action. Then, when the user selects a pasting destination (1010), a plurality of data copied in the memory is copied to the fields lower than the node of the selected field (1011).

Incidentally, if the data type of the selected field is different from the data type of the copy source and the group pasting selection is determined to be not available in 1003, "group pasting" is grayed out and not available (disabled) in the context menu, and the paste is prevented (1012). Thus, the area available for paste can be limited to only fields with the same type as the copy source, and incorrect paste operations to input fields can be prevented.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A computer program for realizing the present invention may be stored in an internal or external storage medium. Storage media include not only a CD-ROM, a flexible disc and the like, but also an optical recording medium such as CD, DVD; a magneto-optic disk medium such as MO; a tape medium; and a semiconductor memory such as an IC card, and the like. Also, a program may be provided to a computer by using a memory unit such as a hard disk, a RAM, and the like, as a recording medium, via a network in a server system connected to the internet or a dedicated communication network.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

What is claimed is:

1. A method of copying and pasting data inputted in a plurality of input fields, comprising the steps of:
   reading out relative information of structured information of a hierarchical structure, acquired by analyzing input fields and field names of the plurality of input fields, from a memory unit;
   displaying a context menu including a group copy function, in response to clicking of a pointing device in an input field;
   displaying, as a subcategory of the group copy function, a list of one or more parent nodes of a node in the structured information corresponding to the input field at which clicking of the pointing device is detected, in a case where a pointer is positioned at the group copy function;
   copying, in response to selecting a parent node to be copied from the list of one or more parent nodes, data and a data type of nodes lower in the hierarchical structure than the selected parent node into a memory;
   comparing, in response to clicking of the pointing device at an input field selected as a pasting destination, a data type of the input field selected as the pasting destination with the data type of the data copied in the memory;
   displaying a context menu including a group pasting function, in a case where the data type of the input field selected as the pasting destination is identical to the data type of the data copied in the memory; and
   pasting the data from the memory into input fields lower than the input field selected as the pasting destination, in a case where the group pasting function is selected.

2. The method according to claim 1, further comprising the step of:
   highlight-displaying all the input fields lower than the input field corresponding to the parent node at which the pointer is positioned, in response to positioning of the pointer in the parent node displayed as the selection to be copied.

3. The method according to claim 1, further comprising the steps of:
   highlight-displaying all the input fields corresponding to nodes lower than the parent node copied in the memory, in response to positioning of the pointer in the parent node displayed as the selection to be copied, and
   searching a node having the same data type as the parent node, and highlight-displaying input fields lower than the input field corresponding to the node having the same type as the parent node selected.

4. The method according to claim 1, further comprising the steps of:
   acquiring a node of highest position in the data stored in the memory, in response to positioning of the pointer at the group pasting function of the context menu,
   acquiring a node having the same data type as the node of the highest position and lower nodes thereof from the structured information, and
   highlight-displaying input fields corresponding to the node having the same data type as the node in the highest position in the data stored in the memory and the lower nodes thereof, as input fields available for pasting.

5. The method of claim 1, wherein the relative information of structure information of a hierarchical structure is obtained from analysis of data items of a graphical user interface of an input screen.

6. The method of claim 1, wherein the relative information of structure information of a hierarchical structure is obtained from path information embedded in the plurality of input fields.

7. The method of claim 6, wherein the path information is XPath information specifying a hierarchy of input fields associated with an input field in which the XPath information is embedded.

8. The method of claim 1, wherein a data type of a node is defined in a class attribute or a name attribute specified in a span tag associated with the node.

9. An apparatus of copying and pasting data inputted in a plurality of input fields, comprising:
   a processor; and
   a memory coupled to the processor, wherein the memory comprises instructions which, when executed by the processor, cause the processor to:
   read out relative information of structured information of a hierarchical structure, acquired by analyzing the input fields and field names of the plurality of input fields, from a memory unit;
   display a context menu including a group copy function, in response to clicking of a pointing device in an input field;
   display, a subcategory of the group copy function, a list of one or more parent nodes of a node in the structured information corresponding to the input field at which clicking of the pointing device is detected, in a case where a pointer is positioned at the group copy function;
   copy, in response to selecting a parent node to be copied from the list of one or more parent nodes, data and data types of nodes lower in the hierarchical structure than the selected parent node into the memory;
   compare, in response to clicking of the pointing device at an input field selected as a pasting destination, a data type of the input field selected as the pasting destination with the data type of the data copied into the memory;
   display a context menu including a group pasting function, in a case where the data type of the input field selected as the pasting destination is identical to the data type of the data copied in the memory; and
   paste data copied in the memory into input fields lower than the input field selected as the pasting destination, in a case where the group pasting function is selected.

10. The apparatus according to claim 9, wherein the instructions further cause the processor to:
    highlight-display all the input fields lower than the input field corresponding to the parent node at which the pointer is positioned, in response to positioning of the pointer in the parent node displayed as the alternative to be copied.

11. The apparatus according to claim 9, wherein the instructions further cause the processor to:
    highlight-display all the input fields corresponding to nodes lower than the parent node copied in the memory, in response to positioning of the pointer in the parent node displayed as the selection to be copied, and
    search a node having the same data type as the parent node, and highlight-displaying input fields corresponding and lower than the input field corresponding to the nodes having the same type as the parent node selected.

12. The apparatus according to claim 9, wherein the instructions further cause the processor to:
  acquire a node of highest position in the data stored in the memory in response to positioning of the pointer at the group pasting function of the context menu,
  acquire a node, having the same data type as the node of the highest position, and lower nodes thereof from the structured information, and
  highlight-display input fields corresponding to the nodes, having the same data type as the node in the highest position in the data stored in the memory and the lower nodes thereof, as input fields available for pasting.

13. A computer program product stored in a memory medium which can be read by a computer performing a method of copying and pasting data inputted in a plurality of input fields in a computer system, the method comprising:
  reading out relative information of structured information of a hierarchical structure, acquired by analyzing the input fields and the field names of the plurality of input fields, from a memory unit;
  displaying a context menu including a group copy function in response to clicking of a pointing device in an input field;
  displaying, a subcategory of the group copy function, a list of one or more parent nodes of a node in the structured information corresponding to the input field at which clicking of the pointing device is detected, in a case where a pointer is positioned at the group copy function;
  copying, in response to selecting a parent node to be copied from the list of one or more parent nodes, data and a data type of nodes lower in the hierarchical structure than the selected parent node into a memory;
  comparing, in response to clicking of the pointing device at an input field selected as a pasting destination, data type of the input field selected as the pasting destination with the data type of the data copied into the memory;
  displaying a context menu including a group pasting function, in a case where the data type of the input field selected as the pasting destination is identical to the data type of the data copied in the memory; and
  pasting data copied in the memory into input fields lower than the input field selected as the pasting destination, in a case where the group pasting function is selected.

14. The computer program product according to claim 13, further comprising:
  highlight-displaying all the input fields lower than the input field corresponding to the parent node at which the pointer is positioned, in response to positioning of the pointer in the parent node displayed as the selection to be copied.

15. The computer program product according to claim 13, further comprising:
  highlight-displaying all the input fields corresponding to nodes lower than the parent node copied in the memory, in response to positioning of the pointer in the parent node displayed as the alternative, and
  searching a node having the same data type as the parent node, and highlight-displaying input fields lower than the input field corresponding to the nodes having the same type as the parent node selected.

16. The computer program product according to claim 13, further comprising:
  acquiring a node of highest position in the data stored in the memory in response to positioning of the pointer at the group pasting function of the context menu,
  acquiring a node having the same data type as the node of the highest position, and lower nodes thereof from the structured information, and
  highlight-displaying input fields corresponding to the nodes, having the same data type as the node in the highest position in the data stored in the memory, and the lower nodes thereof, as input fields available for pasting.

17. The computer program product of claim 13, wherein the relative information of structure information of a hierarchical structure is obtained from analysis of data items of a graphical user interface of an input screen.

18. The computer program product of claim 13, wherein the relative information of structure information of a hierarchical structure is obtained from path information embedded in the plurality of input fields.

19. The computer program product of claim 18, wherein the path information is XPath information specifying a hierarchy of input fields associated with an input field in which the XPath information is embedded.

20. The computer program product of claim 13, wherein a data type of a node is defined in a class attribute or a name attribute specified in a span tag associated with the node.

* * * * *